3,275,103
BRAKE ROLLER RETAINER
Lyman R. Lyon, Royal Oak, Mich., assignor to Fruehauf Corporation, Detroit, Mich., a corporation of Michigan
Filed Oct. 11, 1965, Ser. No. 494,489
1 Claim. (Cl. 188—78)

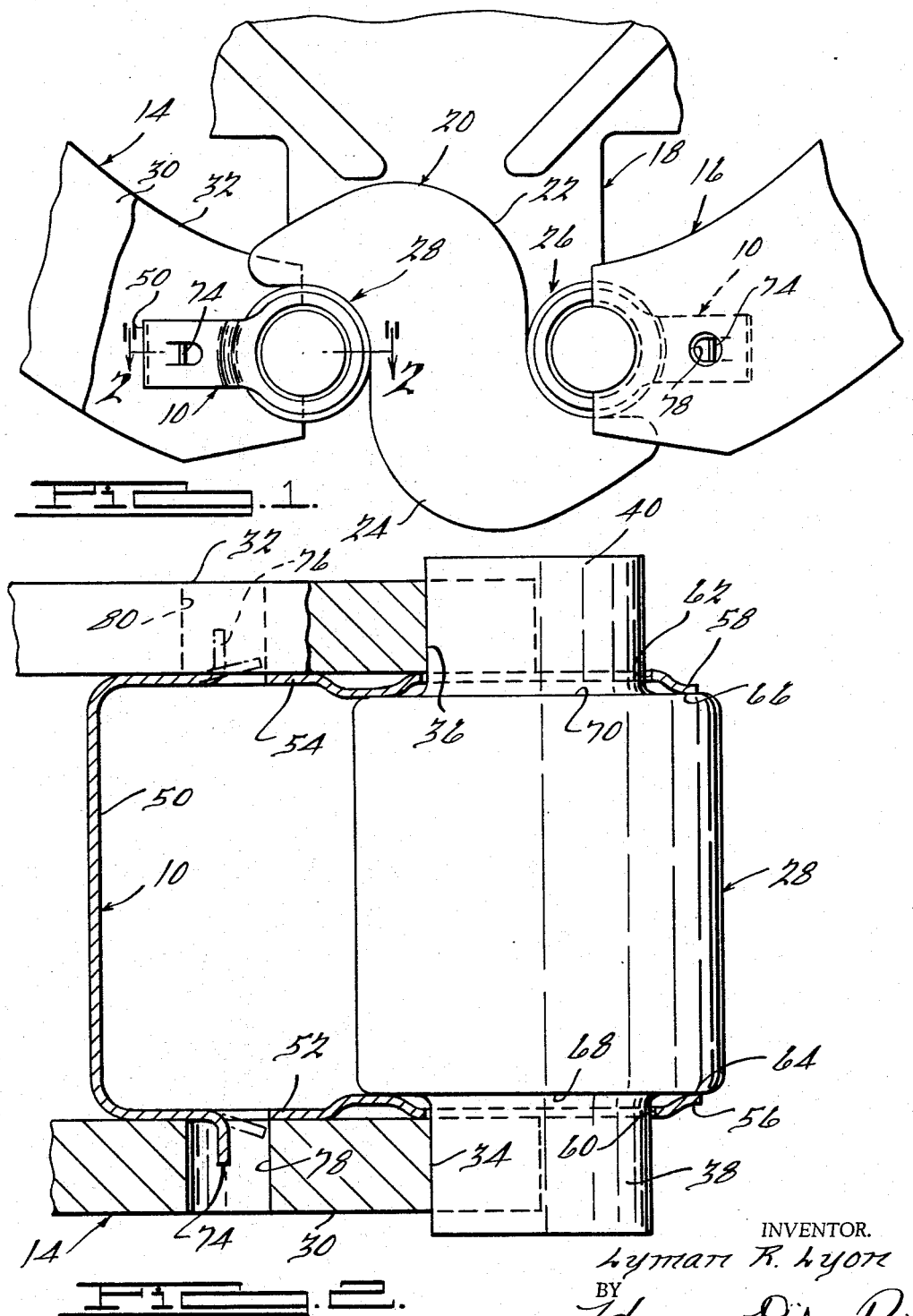

This invention relates generally to brakes of the type used on automobiles, trucks, trailers, buses and the like and more particularly to a novel retainer for the roller used in conjunction with internally expanding "S-cam" brakes.

It is the customary practice in the brake art to seat the ends of the rollers of "S-cam" brakes directly on the brake shoes adjacent the ends thereof. Such rollers have heretofore been retained on their associated shoes by means of retaining springs or washers that maintain a bias on the rollers yet allow rotation of the rollers upon actuation of the "S-cam." It has frequently been the case, however, that such rollers become "frozen" in their seats on the shoes due to road dirt, corrosion and the like. Such a condition presents a serious safety problem since brake pressure increases when the rollers are frozen. In addition, "freezing" of the rollers results in excessive friction between the roller and the "S-cam" leading to excessive component wear.

The present invention relates to a new and improved roller retainer that is interposed between the webs of each brake shoe for the positioning and retention of a roller. The retainer is preferably constructed of a corrosion resistant material, for example, stainless steel, and therefore prevents the associated roller from becoming "frozen" due to rust, corrosion, etc.

Accordingly, one object of the present invention is a new and improved roller retainer for use in an internally expanding brake shoe assembly.

Another object of the present invention is a new and improved roller retainer which may be easily and quickly removed and be replaced without welding, reaming or drilling.

Other objects and advantages of the present invention will become apparent from the following detailed description, claim and drawing, wherein:

FIGURE 1 is a partially broken away view of a portion of a brake assembly comprising a pair of expanding brake shoes, an S-cam, and a pair of brake roller retainers embodying the principles of the present invention; and FIG. 2 is an enlarged cross sectional view taken along the line 2—2 of FIGURE 1.

Referring now to FIG. 1 of the drawing, a pair of brake roller retainers 10, constructed in accordance with an exemplary embodiment of the present invention, are shown in operative association with a conventional brake assembly comprising a pair of arcuate brake shoes 14 and 16 and a central brake spider member 18. An S-cam 20 is journaled on the spider 18, cam faces 22 and 24 thereon being engageable with a pair of brake shoe rollers 26 and 28, respectively.

The brake shoe 14 includes web sections 30 and 32 that are formed with aligned roller notches 34 and 36 for the seating acceptance of the end portions 38 and 40 of the roller.

In accordance with the instant invention the brake roller retainer 10 is made from, for example, stainless steel and is of generally U-shaped configuration comprising a bight portion 50 and leg portions 52 and 54. The leg portions 52 and 54 are provided with inwardly formed circular bosses 56 and 58 having central apertures 60 and 62 therein, respectively, for the acceptance of the end portions 38 and 40 of the roller 28. The annular inner edges 64 and 66 of the bosses 56 and 58 engage shoulders 68 and 70 on the roller 28 to position the roller at all times relative to the brake shoe 14.

The brake roller retainer 10 and therefore the roller 28 is retained on the brake shoe 14 by a pair of outwardly folded ears 74 and 76 that are accepted in complementary bores 78 and 80 in the web portions 30 and 32, respectively, of the brake shoe 14.

From the foregoing description it should be apparent that the roller 28 is supported by the retainer 10 in a manner that permits limited movement thereof relative to the brake shoe 14 toward and away from the S-cam 20. Furthermore, the roller 28 is positioned axially between the web portions 30 and 32 of the brake shoe 14 so that the shoulders 68 and 70 thereof do not engage the web portions 30 and 32 of the brake shoe 14. In this manner relatively heavy bearing forces are transmitted directly between the roller 28 and web portions 30 and 32 but the areas of relatively light frictional engagement wherein rusting and corrosion are ordinarily found are maintained in a spaced relation, the stainless steel leg portions 52 and 54 of the retainer 10 being interposed therebetween.

It is to be understood that the specific construction of the improved brake roller retainer herein disclosed and described is presented for the purpose of explanation and illustration and is not intended to indicate limits of the invention the scope of which is defined by the following claim.

What is claimed is:

In a brake assembly comprising a brake shoe having a pair of spaced webs, an S-cam, and a roller interposed therebetween,
 a generally U-shaped roller retainer having a bight portion extending between the web portions of said brake shoe, and leg portions extending generally parallel to the web portions of said brake shoe, the leg portions of said retainer having axially aligned circular bores therein for the acceptance of opposite ends of said roller,
 the periphery of the bores in the leg portions of said retainer being axially offset to define bearing surfaces, respectively, engageable with said roller to limit axial movement thereof, and
 interlocking means on each of said legs engageable with the web portions of said brake shoe, respectively, for securing said retainer to said brake shoe.

References Cited by the Examiner
UNITED STATES PATENTS 2,710,076    6/1955    Russell _____ 188—78
2,781,868    2/1957    House _____ 188—78

MILTON BUCHLER, *Primary Examiner.*
DUANE A. REGER, *Examiner.*